(12) United States Patent
Cimadamore et al.

(10) Patent No.: US 10,303,467 B2
(45) Date of Patent: May 28, 2019

(54) TARGET TYPING-DEPENDENT COMBINATORIAL CODE ANALYSIS

(71) Applicant: Oracle International Corporation, Redwood City, CA (US)

(72) Inventors: Maurizio Cimadamore, Dublin (IE); Brian Goetz, Williston, VT (US)

(73) Assignee: Oracle International Corporation, Redwood City, CA (US)

( * ) Notice: Subject to any disclaimer, the term of this patent is extended or adjusted under 35 U.S.C. 154(b) by 24 days.

(21) Appl. No.: 14/685,386

(22) Filed: Apr. 13, 2015

(65) Prior Publication Data
US 2016/0299831 A1 Oct. 13, 2016

(51) Int. Cl.
*G06Q 99/00* (2006.01)
*G06F 8/75* (2018.01)
*G06F 8/72* (2018.01)
*G06F 11/36* (2006.01)

(52) U.S. Cl.
CPC ............... *G06F 8/75* (2013.01); *G06F 8/72* (2013.01); *G06F 11/3624* (2013.01)

(58) Field of Classification Search
CPC .................................................. G06F 11/3624
See application file for complete search history.

(56) References Cited

U.S. PATENT DOCUMENTS

| | | | | |
|---|---|---|---|---|
| 5,634,072 A * | 5/1997 | Allen | ............... | G06F 9/5077 709/225 |
| 6,490,695 B1 * | 12/2002 | Zagorski | ............... | G06F 11/362 707/999.002 |
| 7,139,999 B2 * | 11/2006 | Bowman-Amuah | ............... | G06Q 10/06 717/100 |
| 7,370,318 B1 * | 5/2008 | Howe | ............... | G06F 8/4441 717/110 |
| 7,512,935 B1 * | 3/2009 | Cobb | ............... | G06F 8/41 717/130 |
| 8,813,049 B2 | 8/2014 | Goetz et al. | | |
| 8,935,673 B1 * | 1/2015 | Ashkenazi | ............... | G06F 11/3636 702/186 |
| 9,021,458 B1 * | 4/2015 | Jacob | ............... | G06F 8/65 717/168 |
| 2006/0123384 A1 * | 6/2006 | Nickell | ............... | G06F 8/72 717/100 |

(Continued)

OTHER PUBLICATIONS

Martin Fowler, "What is Refactoring," downloaded from http://wiki.c2.com/?WhatIsRefactoring, Dec. 17, 2012, pp. 1-8.

*Primary Examiner* — Li B. Zhen
*Assistant Examiner* — Mohammad H Kabir
(74) *Attorney, Agent, or Firm* — Robert C. Kowert; Meyertons, Hood, Kivlin, Kowert & Goetzel, P.C.

(57) ABSTRACT

A code analysis tool identifies a first and a second proposed code transformation (PCT) for respective expressions within a refactoring candidate section of source code, such that at least one PCT would result in an exercise of a target typing mechanism of the programming language being used. The determination of the data type of at least one of the expressions depends on the determination of the data type of the other. The tool generates a plurality of PCT combinations for the refactoring candidate section. In response to determining that a particular PCT combination meets acceptance criteria, a refactoring option which includes that PCT combination is recommended.

20 Claims, 10 Drawing Sheets

(56) References Cited

U.S. PATENT DOCUMENTS

| | | | | |
|---|---|---|---|---|
| 2006/0241961 A1* | 10/2006 | Tsyganskiy | ............... | G06F 8/72 717/104 |
| 2007/0044083 A1* | 2/2007 | Meijer | ................... | G06F 8/311 717/151 |
| 2008/0256393 A1* | 10/2008 | Ur | ...................... | G06F 11/3616 714/38.1 |
| 2009/0222799 A1* | 9/2009 | Stewart | .................. | G06F 8/427 717/143 |
| 2013/0332722 A1* | 12/2013 | Kuroda | .................... | G06F 8/72 713/100 |
| 2014/0165035 A1* | 6/2014 | Campbell | ................ | G06F 8/72 717/121 |
| 2015/0378717 A1* | 12/2015 | Jacob | ....................... | G06F 8/65 717/124 |

\* cited by examiner

PCT combination acceptance table 710

| Name | PCT1 | PCT2 | PCT3 | PCT4 | Acceptance criteria met? |
|---|---|---|---|---|---|
| C0 | 0 | 0 | 0 | 0 | (N/A: Original code) |
| C1 | 0 | 0 | 0 | 1 | No |
| C2 | 0 | 0 | 1 | 0 | Yes |
| C3 | 0 | 0 | 1 | 1 | Yes |
| C4 | 0 | 1 | 0 | 0 | No |
| C5 | 0 | 1 | 0 | 1 | Yes |
| C6 | 0 | 1 | 1 | 0 | Yes |
| C7 | 0 | 1 | 1 | 1 | Yes |
| C8 | 1 | 0 | 0 | 0 | No |
| C9 | 1 | 0 | 0 | 1 | Yes |
| C10 | 1 | 0 | 1 | 0 | Yes |
| C11 | 1 | 0 | 1 | 1 | Yes |
| C12 | 1 | 1 | 0 | 0 | No |
| C13 | 1 | 1 | 0 | 1 | No |
| C14 | 1 | 1 | 1 | 0 | Yes |
| C15 | 1 | 1 | 1 | 1 | Yes |

Per-PCT (independent) decision table 712

| | All combinations with PCT included (indicated by "1") meet acceptance criteria? | Include PCT in refactoring options? |
|---|---|---|
| PCT1 | No (C8, C12, C13 fail) | No |
| PCT2 | No (C4, C12, C13 fail) | No |
| PCT3 | Yes | Yes |
| PCT4 | No (C1, C13 fail) | No |

FIG. 7

PCT combination acceptance table 710

| Name | PCT1 | PCT2 | PCT3 | PCT4 | Acceptance criteria met? |
|---|---|---|---|---|---|
| C0 | 0 | 0 | 0 | 0 | (N/A: Original code) |
| C1 | 0 | 0 | 0 | 1 | No |
| C2 | 0 | 0 | 1 | 0 | Yes |
| C3 | 0 | 0 | 1 | 1 | Yes |
| C4 | 0 | 1 | 0 | 0 | No |
| C5 | 0 | 1 | 0 | 1 | Yes |
| C6 | 0 | 1 | 1 | 0 | Yes |
| C7 | 0 | 1 | 1 | 1 | Yes |
| C8 | 1 | 0 | 0 | 0 | No |
| C9 | 1 | 0 | 0 | 1 | Yes |
| C10 | 1 | 0 | 1 | 0 | Yes |
| C11 | 1 | 0 | 1 | 1 | Yes |
| C12 | 1 | 1 | 0 | 0 | No |
| C13 | 1 | 1 | 0 | 1 | No |
| C14 | 1 | 1 | 1 | 0 | Yes |
| C15 | 1 | 1 | 1 | 1 | Yes |

PCT-pair decision table 812

| | All combinations with PCT pairs included meet acceptance criteria? | Include PCT pair in refactoring options? |
|---|---|---|
| PCT1, PCT2 | No (C12, C13 fail) | No |
| PCT1, PCT3 | Yes | Yes |
| PCT1, PCT4 | No (C13 fails) | No |
| PCT2, PCT3 | Yes | Yes |
| PCT2, PCT4 | No (C13 fails) | No |
| PCT3, PCT4 | Yes | Yes |

FIG. 8

TARGET TYPING-DEPENDENT COMBINATORIAL CODE ANALYSIS

BACKGROUND

Programs written in languages such as Java™ may sometimes be used to implement business applications which are used for years after the programs were originally written. During the lifetime of such applications, many new features and enhancements may be introduced into new versions of the programming language, with the intention of enabling programmers to accomplish various application tasks more easily or more concisely than may have been possible with earlier versions. For example, enhancements to the type management mechanisms of a programming language may be implemented, and/or new features such as lambda expressions may be added. Programs written before the introduction of the enhancements may, of course, continue to run without any changes. However, in many situations, it may be beneficial to modify or refactor at least some portions of such programs to take advantage of the new capabilities of the programming language.

Such refactoring transformations may make the source code more readable and therefore easier to understand and debug, for example, and at least in some cases may make the code safer by resolving potential ambiguities. At least some programs written after the introduction of the enhancements into the programming language may also benefit from such transformations, especially because not all the programmers involved may be aware of (or fluent in the use of) the new features. However, as the sophistication of the enhancements and new features of the language increases, and multiple related code transformations that could impact each other in subtle ways become feasible, identifying which particular refactoring opportunities can be implemented may become a non-trivial task.

SUMMARY

Various embodiments of apparatus and methods for a code analysis tool (CAT) that can identify acceptable combinations of multiple target typing-dependent refactoring opportunities within source code written in numerous kinds of programming languages are disclosed. According to one embodiment, a code analysis tool examines source code representing at least a portion of one or more computer programs and identifies one or more refactoring candidate sections within the source code. In some implementations, a set of code patterns or templates that correspond to possible refactoring opportunities (including opportunities that would be influenced or affected by target typing) may be maintained by the tool, for example, and the candidate sections may be identified using pattern matching. A particular refactoring section identified by the tool may include a plurality of expressions including a first expression and a second expression respectively corresponding to a first and second proposed code transformation (PCT). The implementation of one or both of the PCTs of the refactoring section may result in the use of the target typing mechanisms of the programming language. Furthermore, the first and second PCTs may be dependent upon each other—that is, after the application of one or both PCTs associated with the first and second expressions, the determination of the data type of at least one expression may depend at least in part on the determination of the data type of the other expression. It is noted that the use of the terms "first" and "second" herein is not intended to suggest any particular order with respect to the sequence in which the expressions or PCTs are identified or processed; rather, such terms are used simply as labels or designations of different expressions or different PCTs. Similarly, the application of terms such as "first", "second", or "third" to other entities of a group of like entities herein is not, by itself, intended to imply ordering. In some cases, the dependency may involve the analysis of a different code section (e.g., a method declaration at a different location in the source code)—that is, the dependencies may be subtle and indirect. The CAT may identify several refactoring candidate sections in the source code, each with its own set of related or inter-dependent PCTs which involve the use of target typing. (In at least some embodiments, the CAT may also identify other, simpler, code transformations that do not involve inter-dependencies and/or do not rely upon target typing or other type inference-related mechanisms.)

Having identified at least the first and second PCTs for the first refactoring candidate section of the code, in various embodiments the CAT may generate a plurality of PCT combinations that may in principle be applied to the first refactoring candidate section. For example, if three PCTs (PCT1, PCT2 and PCT3) are identified for three expressions (expr1, expr2, and expr3) respectively within a given refactoring candidate section, seven ($2^3-1$) different combinations of transformations may be generated, each of which includes at least one of the three PCTs. The CAT may then determine whether at least some of the different combinations, when considered one at a time or in sub-groups, meet one or more acceptance criteria. A number of different criteria may be used in different embodiments. For example, in one embodiment, error-free compilation may be the only criterion used—that is, a given PCT combination may be considered acceptable if, subsequent to the application of all the transformations included in the combination, the source code would compile without errors. In some embodiments, additional levels of acceptance criteria may be used—e.g., not only would the code have to compile without errors for the combination to be deemed acceptable, but the particular methods selected for one or more overloaded method calls may have to match the methods that would have been selected in the original (untransformed) source code. Thus, at least in some embodiments, the CAT may utilize compiler functionality to verify acceptability of the PCT combinations. In at least one embodiment, the CAT may itself be implemented as a component of a compiler. In other embodiments, the CAT may be implemented as part of an IDE (integrated development environment) that either implements its own version of a subset of compiler capabilities, or utilizes a separate compiler.

If the CAT is able to find at least one acceptable combination of PCTs (where a combination may include as few as one of the PCTs, and as many as all of the PCTs), in various embodiments the CAT may include the acceptable combinations in a collection of recommended refactoring options to be provided to a user, while excluding combinations that are found unacceptable. For example, an indication of the acceptable or recommended combination or combinations may be stored in one or more memories, from which the indications may be accessed by or transmitted to the user. In some implementations, the CAT may require the user to approve or select the particular transformations to be applied before a new version of the source code is generated, and the CAT may implement one or more interactive programmatic interfaces enabling the client to do so. In at least one embodiment, if multiple acceptable PCT combinations are found, the CAT may attempt to prune the list of combinations based on various heuristics or rules—e.g., for a given refactoring candidate section for which N acceptable PCT combinations are found, the K (where K<N) PCT combinations that result in the greatest reduction in code size may be retained for presentation to the user. In some embodiments, the CAT may use a variety of criteria to rank the acceptable PCT combinations in order of quality—e.g., the extent of the reduction in the size of the source code, the increase in readability of the code (as estimated by the CAT based on guidelines regarding factors that make code readable), and/or the increase in "safety" with respect to a compiler's decisions may be considered as quality indicators. In some such embodiments, a quality-ranked list of some or all of the acceptable PCTs may be provided to a user. In at least one embodiment in which a user explicitly or implicitly indicates prior approval of code transformations that may be found acceptable by the tool, the CAT may simply generate a new version of the source code, and provide the new version and a list of the applied transformations to the user. In at least one embodiment, the CAT may only be responsible for identifying the acceptable transformation combinations, and new versions of the source code may be generated using tools other than the CAT.

A number of different kinds of potentially interdependent code transformations that involve type inference features such as target typing may be feasible in various embodiments. For example, in one embodiment, such transformations may involve the elimination of redundant explicit type arguments (e.g., either from an instance creation expression or from a generic method call), the removal of explicit formal argument types from a lambda expression, instance creation expression or generic method call, the removal of certain kinds of casts, and/or other substitutions involving the use of lambda expressions or method references (e.g., to replace anonymous functions). The combinatorial analysis approach for determining acceptable sets of PCTs involving the use of target typing may be used for source code written in a variety of languages in various embodiments—e.g., for Java™, ML, F#, Haskell, Scala, D, Clean, Opa, Rust, Swift and the like. Some of the programming languages may be object-oriented, others may be primarily used for functional programming, while still others may use a combination of such approaches.

BRIEF DESCRIPTION OF THE DRAWINGS

FIG. 7 illustrates an example of a set of decisions that may be made by a code analysis tool regarding the inclusion, within a set of refactoring options to be provided to a user, of individual code transformations of a set of four potential identified code transformations, according to at least some embodiments.

FIG. 8 illustrates an example of a set of decisions that may be made by a code analysis tool regarding the inclusion, within a set of refactoring options to be provided to a user, of pairs of code transformations of a set of four potential identified code transformations, according to at least some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Figure 1:
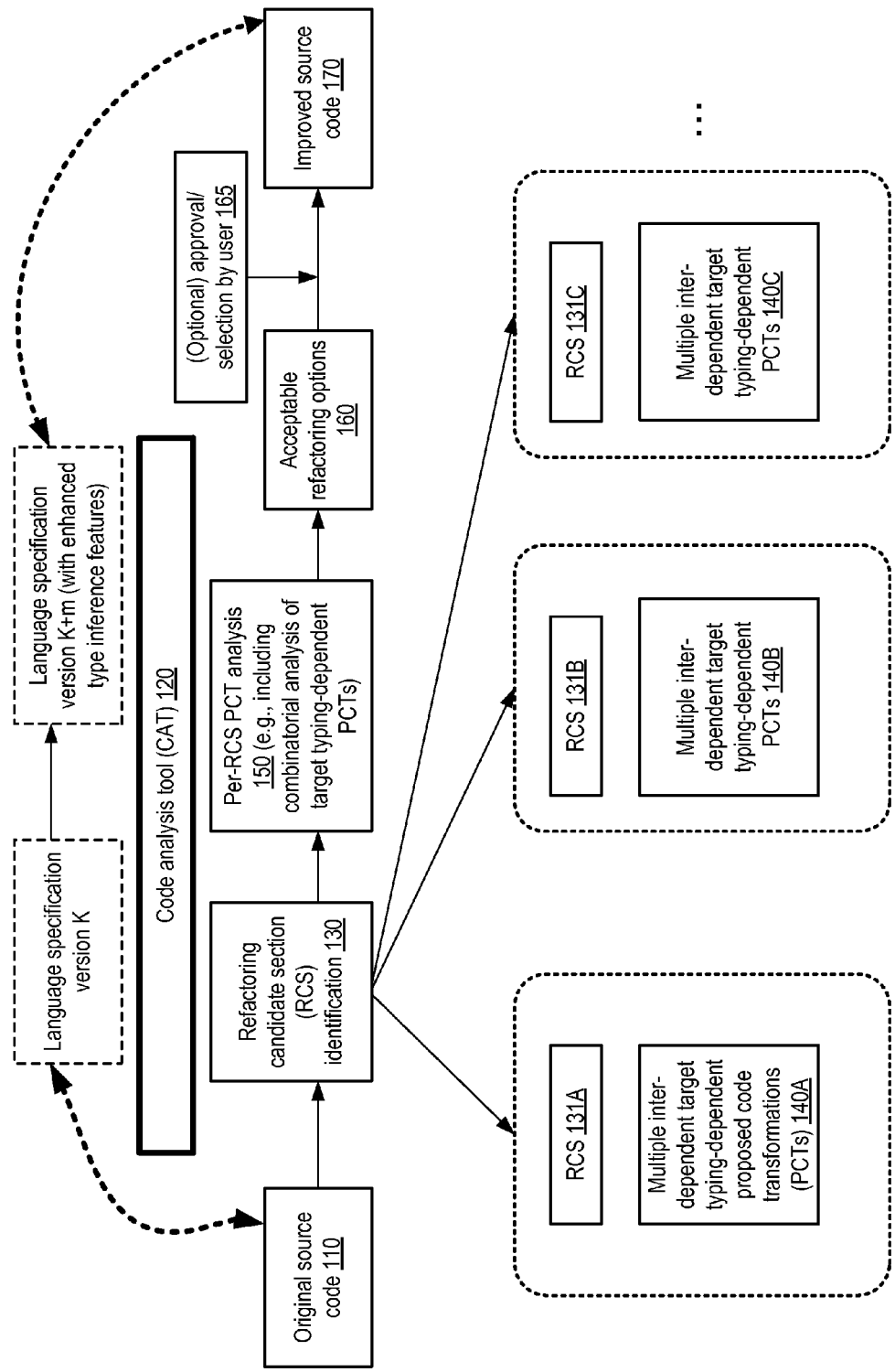
FIG. 1 illustrates a workflow for identifying acceptable source code refactoring options for programs specified in a programming language that supports target typing, according to at least some embodiments.

FIG. 1 illustrates a workflow for identifying acceptable combinations of source code refactoring options which involve the use of target typing features of a programming language, according to at least some embodiments. The high-level components of a workflow implemented by a code analysis tool 120 for a set of original or unmodified source code 110 (e.g., contents of one or more source code files) may include the identification 130 of refactoring candidate sections (RCSs) of the code, followed by per-RCS combinatorial analysis 150 to identify acceptable refactoring options 160 in the depicted embodiment, eventually leading to the creation of a new, simplified or improved version 170 of the source code. In some embodiments, the refactoring operations of the CAT 120 may be triggered at least in part by the release or publication of a new version of the programming language being used for the source code, although such changes in version are not a requirement. For example, in the depicted scenario, the original source code 110 may have been written in accordance with a version K of the programming language specification, and at least one new version (K+m) of the specification may have subsequently been released. If the newer version include new features such as enhanced target typing-related capabilities, some sections of the source code may be candidates for code simplification or substitution.

Generally speaking, "type inference" (also known as "type reconstruction") allows a compiler or other similar code analysis tool to infer the data types of variables, method parameters, generic class type parameters, generic method type parameters, and the like, based on how they are used in a program. The "target type" of an expression is the data type that the compiler or code analysis tool expects, depending on where the expression appears. "Target typing" refers to using the target type for an expression to infer types that may be omitted from that expression. At a high level, the relationship between type inference and target typing may be summarized in the following way. Because type inference is based on constraint solving, the type inference mechanisms of a language may sometimes fail to arrive at a unique answer with respect to the data types of one or more expressions within a section of source code. In such situations, heuristics and/or user involvement may sometimes be needed to identify a best choice. When designing and implementing type inference mechanisms, selecting the particular constraints to be applied in various scenarios may present interesting challenges. Target typing—using the assignment context and/or the method invocation context as a constraint—is one such choice. While the particular examples provided in this document apply mostly to type parameters (such as type parameters to constructor invocations like "new ArrayList<String>", or type parameters to generic methods), type inference can work equally well on manifest types for variables in programs (local variable declarations, formal arguments to lambda expressions, and even method parameter and return types.).

In practice, many of the new features released in programming languages are typically demand-driven: e.g., when programmers identify programming patterns or use cases that are difficult to deal with in the current version of a language, the designers of the language may add support for easier ways of accomplishing the heretofore difficult programming goals in a new version. Instead of manually identifying all the places in potentially large source code repositories to which the newly-supported features may be applicable, an automated tool such as CAT 120 may be employed. It is noted, however, that the use of the CAT 120 is not restricted to contexts in which new features or new versions of programming languages become available; that is, in various embodiments, code analysis of the kind described herein may be performed independently of the evolution of the programming language involved.

In the depicted embodiment, the CAT 120 may examine the original source code 110 in an attempt to match a set of patterns or templates that indicate possible combinations of multiple refactoring opportunities, e.g., including combinations that involve the use of target typing. A number of different refactoring candidate sections (RCSs) 131 may be found by the CAT 120 in the depicted embodiment. At least some of the RCSs, such as RCSs 131A, 131B and 131C, may include respective sets of multiple potential code transformations (PCTs) 140 (e.g., 140A, 140B or 140C) that would, if applied, result in the use of target typing mechanisms of the programming language being used. Some or all of the target typing-dependent PCTs within a given RCS may be interdependent—i.e., the determination of the type of one expression within the RCS may impact the determination of the type of a different expression. It is noted that at least in some embodiments, the kinds of code analysis tools described herein may be used not just to identify acceptable combinations of such interdependent target typing-dependent code transformations, but also to identify other code transformations which may or may not involve the use of target typing or type inference. The target typing-dependent PCTs 140 may include, for example, the removal of redundant explicit type arguments (e.g., either from an instance creation expression or from a generic method call), the removal of explicit formal argument types from a lambda expression, instance creation expression or generic method call, the removal of certain kinds of casts, and/or the substitution of a section of code by a lambda expression or a method reference. (Several specific examples of PCTs involving target typing mechanisms are discussed in greater detail below.) Target typing-independent PCTs 141A may include, for example, simplification of Boolean expressions, removal of unnecessary labels, and the like. In at least one embodiment, the CAT 120 may only identify PCTs that involve the use of target typing.

For at least some of those RCSs for which target typing-dependent PCTs 140 are identified, the CAT 120 may perform a per-RCS analysis 150 involving determining the acceptability and/or relative quality ranking of various combinations of the PCTs. In one implementation, if N different PCTs involving target typing are found, for example, and the CAT determines that the applicability of each of the PCTs is independent of the applicability of the others, $2^N-1$ combinations of the PCTs may be feasible, at least in principle. (In some cases, as discussed below, it may be preferable to apply some subsets of the PCTs jointly instead of considering the acceptability of each of them independently, so the total number of combinations to be examined may differ from $2^N-1$.) The CAT 120 may use one or more criteria to identify acceptable PCT combinations in various embodiments. For example, in one embodiment, at a minimum, in order for a given PCT combination to be considered acceptable, the application of that PCT combination should result in source code that compiles without errors. Other acceptance criteria may, for example, include a requirement that the particular method selected by a compiler for an overloaded method call subsequent to the application of the PCT combination must match the method that was selected for the corresponding overloaded method call in the original source code 110. Additional acceptance criteria involving factors such as code aesthetics guidelines may be used in some embodiments.

If at least one PCT combination which meets all the criteria being considered by the CAT 120 is found, it may be added to a collection of acceptable refactoring options 160 which may be provided or presented to a user or client of CAT 120 in the depicted embodiment. In some embodiments, as indicated by block 165 in FIG. 1, a user or client may utilize one or more programmatic interfaces implemented by the CAT to indicate approval for various refactoring options 160, and/or to select from among a set of acceptable but mutually exclusive refactoring options (i.e., a set of PCT combinations from which no more than one can be applied). In the depicted embodiment, the CAT 120 may implement one or more of the refactoring options, thereby generating a new and improved version 170 of the original source code. In some embodiments, the CAT may only be responsible for identifying and providing acceptable PCT combinations to a user, and the task of generating new versions of the source code (if any are to be generated) may be left to the user's choice of tools.

The remainder of this description focuses largely on the CAT operations which involve target typing-dependent PCTs 140, as such transformations may in general require more sophisticated analysis than those that do not involve the target typing mechanisms of the programming language. This emphasis on target typing should not be interpreted as restricting the CATs which may be deployed in various embodiments, however: in at least some embodiments, for example, the majority of code transformations identified or implemented by a CAT may not involve the use of target typing.

Figure 2:
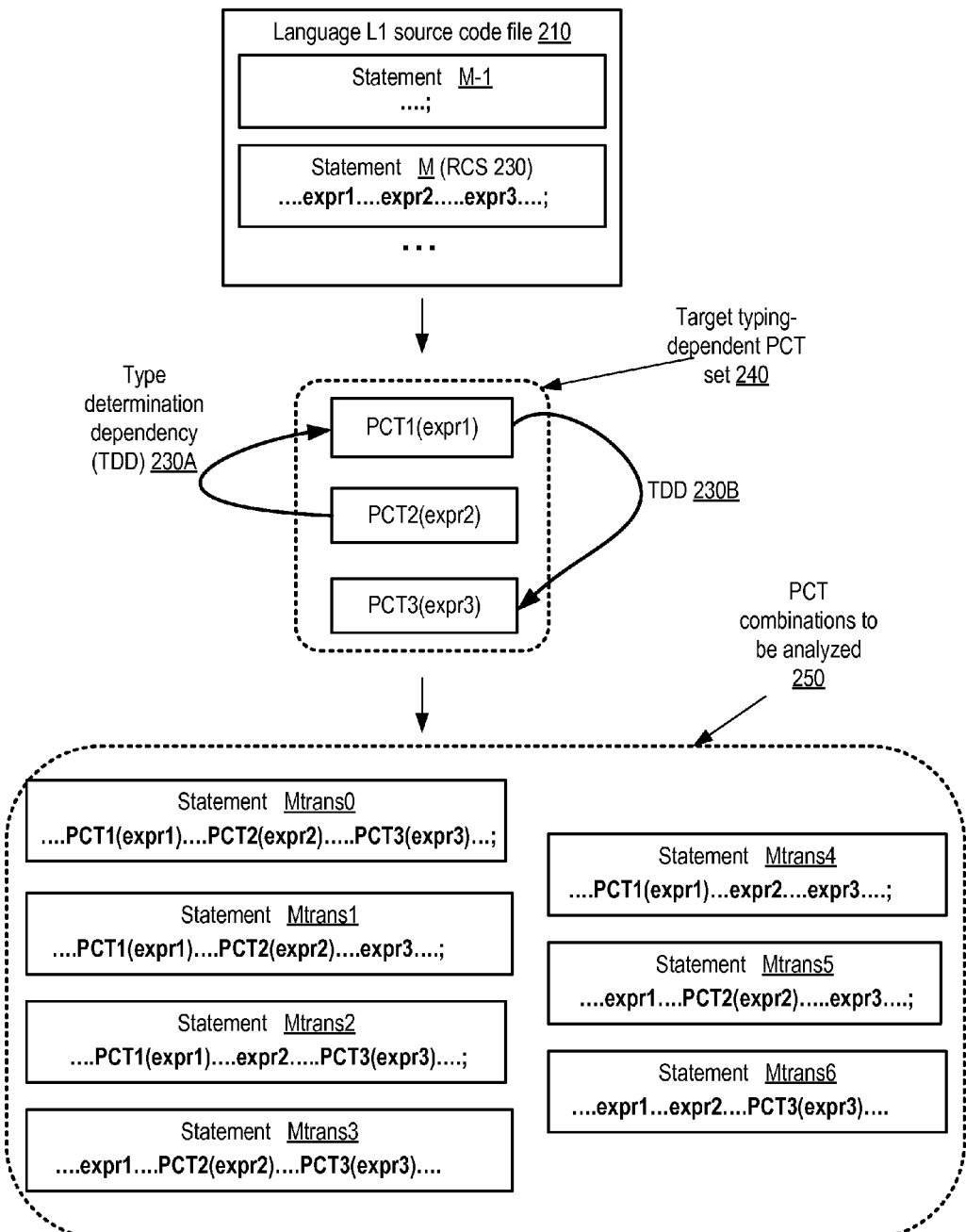
FIG. 2 illustrates an example of interdependent code transformation opportunities that may be identified in source code of a programming language in which target typing-related dependency boundaries may correspond to statement boundaries, according to at least some embodiments.

Programming languages may deal with target typing, and especially with possible interactions or dependencies between different specific instances of target typing, in a variety of ways. FIG. 2 illustrates an example of interdependent code transformation opportunities that may be identified in source code of a programming language in which target typing-related dependency boundaries may correspond to statement boundaries, according to at least some embodiments. According to the rules or specifications governing language L1, whose source code file 210 is examined by a compiler, target typing decisions for a given statement may have to be made based on the information that is obtainable by the end of that statement (a statement may in general comprise the source code between two successive semi-colons, such as the semi-colon at the end of statement M-1 in FIG. 2, and the semi-colon at the end of statement M). In the depicted example, a CAT 120 (which may be part of a compiler as mentioned earlier, or at least may use information generated by a compiler) has found three expressions (expr1, expr2 and expr3) within a single statement M for which target typing-dependent PCTs are to be evaluated. (The ellipses between expr1, expr2 and expr3 indicate that the statement may include other code unrelated to refactoring opportunities.)

Statement M thus represents one example refactoring candidate section (RCS) for source code 210, and the target typing-dependent PCT set 240 identified by the CAT for statement M includes PCT1 for expr1, PCT2 for expr2 and PCT3 for expr3. In the depicted scenario, the determination of a data type of an expression in PCT2 (i.e., in code that would result from an application of PCT2) depends at least in part on the determination of a data type of an expression in PCT1 (as indicated by the arrow labeled type determination dependency (TDD) 230A). Furthermore, the determination of a type of an expression in PCT1 depends on the determination of the type of an expression in PCT3, as indicated by TDD 230B. Thus, when determining the legality or acceptability of one or more of the PCTs of set 240, the CAT may have to evaluate the impact(s) of the PCTs on each other. In the depicted embodiment, the CAT may consider up to seven ($2^3-1$) PCT combinations 250, where each such combination includes one or more of PCT1, PCT2 and PCT3. For, example, the transformed statement Mtrans0 would include all three PCTs, while MTrans1, MTrans2 and MTrans3 may each include two of the three PCTs, and so on. Those of the seven combinations that meet all the acceptance criteria being used may then be included in the set of refactoring options which can be applied to the source code 120.

In a language such as Java™, in which the scope of type determination dependency analysis may be limited to the single-statement level as illustrated in FIG. 2, PCTs for which combinatorial analysis may be employed in various embodiments include the removal of potentially redundant explicit type arguments, and the use of lambda expressions or method references. A few relatively simple examples of these kinds of transformations (based on target typing mechanisms supported in Java™ 8) and the combinations that may be generated from the transformations are provided below. While fairly short refactoring candidate sections, each with no more than two transformation candidates, are provided in these examples to simplify the presentation, in various embodiments the CAT may be able to identify refactoring candidate sections with more numerous transformations and combinations thereof.

Example 1: Removal of Redundant Type Arguments

```
import java.util.*;
// Original source code refactoring candidate section (RCS) starts here
List<String> ls = someMethod(new ArrayList<String>,
    someOtherMethod(new ArrayList<Integer>));
//RCS ends here
// PCTs identified by CAT for RCS based on removal of type arguments
PCT1.1: "new ArrayList<String>" changes to "new ArrayList<>"
PCT1.2: "new ArrayList<Integer>" changes to "new ArrayList<>"
// code resulting from application of PCT combinations, to be
evaluated for acceptance
// combination1.1: apply both PCT1.1 and PCT1.2
List<String> ls = someMethod(new ArrayList<>,
    someOtherMethod(new ArrayList<>));
//combination1.2: apply only PCT1.1
List<String> ls = someMethod(new ArrayList<>,
    someOtherMethod(new ArrayList<Integer>));
//combination1.3: apply only PCT1.2
List<String> ls = someMethod(new ArrayList<String>,
    someOtherMethod(new ArrayList<>));
```

In Example 1, the CAT may identify two opportunities for code simplification by removing the potentially redundant type arguments for the "new ArrayList" expressions in the original source code. From the two PCTs, three ($2^2-1$) combinations may be derived as shown, and each such combination may be checked for acceptability. Then, based on the results of the acceptance tests, one or more of the combinations may be included in a collection of refactoring options that could be implemented, e.g., in response to approval by a user.

Example 2: Redundant Type Arguments and Method Overloading

```
import java.util.*;
class Test {
    <Z> List<Z> someMethod(List<Z> b1, List<Z> b2) {return null; }
    //first "someOtherMethod"declaration
    <Z> List<Z> someOtherMethod(List<Z> b) {return null; }
    // second "someOtherMethod" declaration
    List<Integer> someOtherMethod(ArrayList<Integer> b)
    {return null; }
        void test( ) {
        // RCS starts here
        someMethod(new ArrayList<String>( ),
            someOtherMethod(new ArrayList<String>0));
        //RCS ends here
        }
    }
// PCTs identified
PCT2.1 (for first argument to someMethod):
    "new ArrayList<String>( )" changes to "new ArrayList<>( )"
PCT2.2 (for argument of someOtherMethod):
    "new ArrayList<String>( )" changes to "new ArrayList<>( )"
// code resulting from application of PCT combinations,
to be evaluated for acceptance
// combination2.1: apply both PCT2.1 and PCT2.2
    someMethod(new ArrayList<>( ),
        someOtherMethod(new ArrayList<>( )));
//combination2.2: apply only PCT2.1
    someMethod(new ArrayList<String>( ),
```

-continued
```
    someOtherMethod(new ArrayList<>( )));
//combination2.3: apply only PCT2.2
    someMethod(new ArrayList<>( ),
        someOtherMethod(new ArrayList<String>( )));
```

In Example 2, there are two declarations of "someOtherMethod". According to the language specification, if a parameter with a constructor invocation whose type arguments are inferred, denoted here using the syntax "constructor-name< >" is passed to "someOtherMethod", a compiler would select the more specific version of "someOtherMethod"—that is, the second declaration, in which the "List<Integer>" is returned, would be selected. This would mean that the compilation of combination2.2 would fail, since the first parameter of "someMethod" in combination2.2 is ArrayList<String>, which would be incompatible with the second version of someOtherMethod selected by the compiler. Combination2.1 and combination2.3 may compile without errors, and if the only acceptance test used were compilation success, either or both of these combinations may be selected as refactoring options by the CAT. It is noted that even though both combination2.1 and combination2.3 may compile without errors, this does not really imply that the data type of the argument to someOtherMethod is truly redundant, since that data type impacts the selection of the version of someOtherMethod and therefore impacts the RCS statement as a whole. In general, as in Example 2, inferring type arguments can sometimes perturb other related decisions, such as method overload selection. From among the possibilities resulting from such inferences, those that do not preserve the semantics of the existing program may be rejected in various embodiments, even though they compile without errors.

Example 3: Lambda Expressions

```
import java.util.*;
import java.util. function. *;
class Test {
    <Z> void choose(Function<Z, Byte> f1, Function<Z, Byte> f2) { }
    void test( ) {
      //RCS starts here
      choose(new Function<Integer, Byte>( ) {
        public Byte apply(Integer i) {return i.byteValue( ); }
        },
        new Function<Integer, Byte>( ) {
        public Byte apply(Integer i) {return i.byteValue( ); }
        });
      //RCS ends here
    }
}
// PCTs identified
PCT3.1:
    Replace first argument of choose( ) with lambda
    expression "i->i.byteValue( )"
PCT3.2:
    Replace second argument of choose( ) with "i->i.byteValue( )"
// code resulting from application of PCT combinations,
to be evaluated for acceptance
// combination3.1: apply both PCT3.1 and PCT3.2
    choose(i->i.byteValue( ), i->i.byteValue( ));
//combination3.2: apply only PCT3.1
    choose(i->i.byteValue( ),
        new Function<Integer, Byte>( ) {
        public Byte apply(Integer i) {return i.byteValue( ); }
        });
//combination3.3: apply only PCT3.2
    choose(new Function<Integer, Byte>( ) {
        public Byte apply(Integer i) {return i.byteValue( ); }
        },
        i->i.byteValue( ));
```

In Example 3, at least with some compilers, combination3.1 may fail compilation, while combination3.2 and 3.3 may pass. In addition to the kinds of transformations involving lambda expressions shown in Example 3, in at least some embodiments the CAT may also identify opportunities to substitute lambda expressions with explicitly typed parameters with replacement lambda expressions whose parameters are implicitly typed. For example, the statement "(String s)→s.toUpperCase( )" may be replaced by "s→s.toUpperCase( )".

Example 4: Method References

```
import java.util.*;
import java.util.function. *;
class Test {
    <Z> void choose(Function<Z, Byte> f1, Function<Z, Byte> f2) { }
    void test( ) {
        //RCS starts here
        choose(new Function<Integer, Byte>( ) {
          public Byte apply(Integer i) {return i.byteValue( ); }
          },
          new Function<Integer, Byte>( ) {
          public Byte apply(Integer i) {return i.byteValue( ); }
          });
        //RCS ends here
    }
}
// PCTs identified
PCT4.1:
    Replace first argument of choose( ) with "Integer::byteValue"
PCT4.2:
    Replace second argument of choose( ) with "Integer::byteValue"
// code resulting from application of PCT combinations,
to be evaluated for acceptance
// combination4.1: apply both PCT4.1 and PCT4.2
    choose (Integer::byteValue, Integer::byteValue);
//combination4.2: apply only PCT4.1
    choose(Integer::byteValue,
        new Function<Integer, Byte>( ) {
        public Byte apply(Integer i) {return i.byteValue( ); }
        });
//combination4.3: apply only PCT4.2
    choose(new Function<Integer, Byte>( ) {
        public Byte apply(Integer i) {return i.byteValue( ); }
        },
        Integer::byteValue);
```

It is noted that despite the apparent similarities between Example 3 and Example 4, all three combinations of Example 4 may compile without errors using the same compiler which rejected combination 3.1 of Example 3. This may be the result of subtle differences in the manner in which the compiler's type inference mechanism handles lambda expressions versus method references.

Example 5: Nested Generic Calls

```
class Test {
    <Z> Z choose(Z z1, Z z2) {return null; }
    <Z> Z id(Z z) {return z; }
    void test( ) {
        // RCS starts here
        choose(this.<Integer>id(null), this.<Integer>id(null)).byteValue( );
        //RCS ends here
    }
}
// PCTs identified
PCT5.1:
        Replace first argument of choose( ) with "id(null),"
PCT5.2:
        Replace second argument of choose( ) with "id(null)"
// code resulting from application of PCT combinations,
to be evaluated for acceptance
// combination5.1: apply both PCT5.1 and PCT5.2
        choose(id(null), id(null)).byteValue( );
//combination5.2: apply only PCT5.1
        choose(this.<Integer>id(null), id(null)).byteValue( );
//combination5.3: apply only PCT5.2
        choose(id(null), this.<Integer>id(null)).byteValue( );
```

In Example 5, combination5.1 would be rejected by at least some compilers, while the remaining two combinations may compile without errors. Other examples of target typing-dependent refactoring opportunities that may be identified by a CAT in various embodiment may include removals of certain casts, and/or removals of explicit formal argument types from a lambda expression, instance creation expression or generic method call. For example, the CAT may determine that the statement "Consumer<String> cons= (String s)→System.out.println(s);" may be replaced by either "Consumer<String> cons=s→System.out.println(s);" or "Consumer<String> cons=System.out::println;". It is noted that in addition to refactoring opportunities that involve multiple transformations and hence may benefit from combinatorial analysis, at least in some embodiments a CAT may also identify code simplification opportunities that involve only one transformation and therefore do not require combinatorial analysis, even though such transformations may in at least some cases also result in the use of target typing. In such single-PCT cases, just as in the case of refactoring candidates that include multiple PCTs, the CAT may check the acceptability of the changes using one or more criteria, and include the PCTs that meet the criteria in refactoring options presented to a user.

Figure 3:
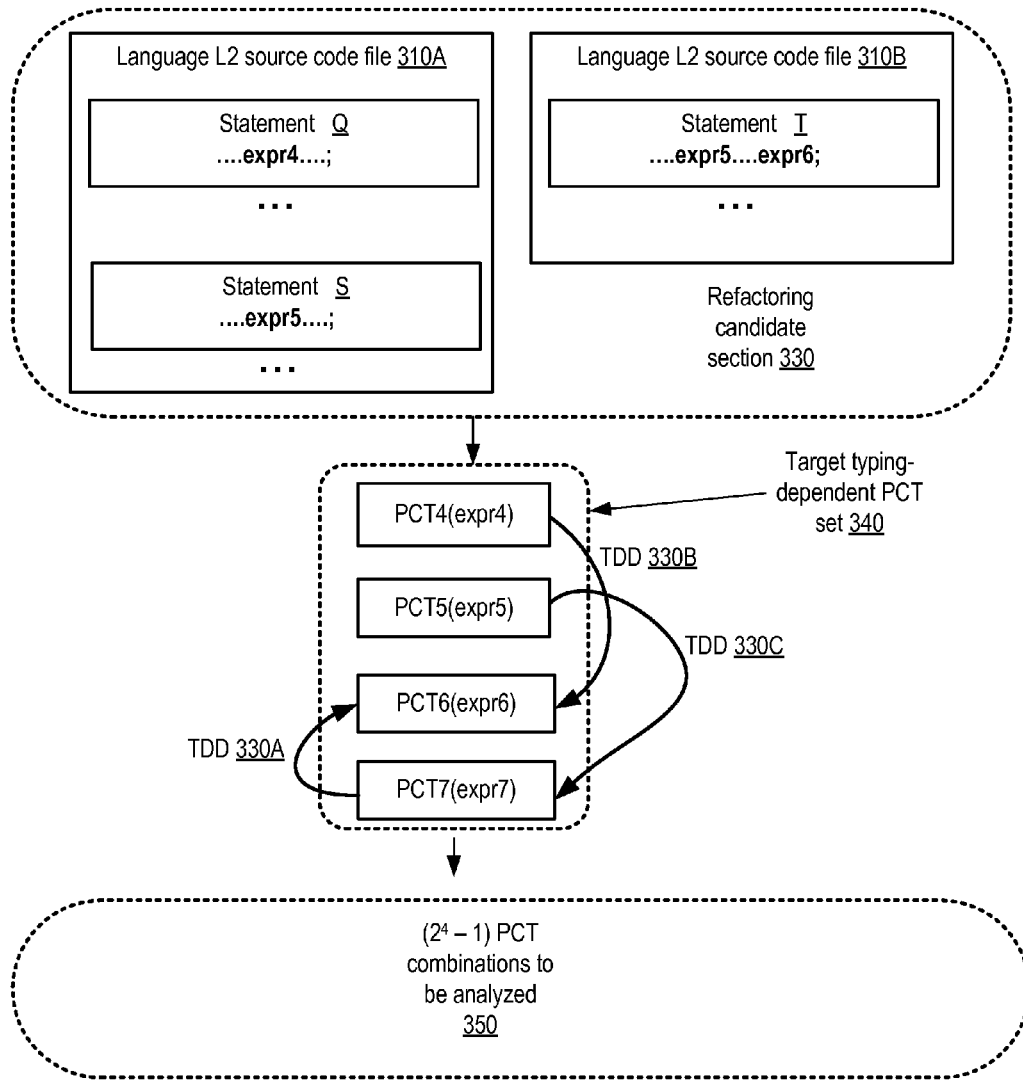
FIG. 3 illustrates an example of interdependent code transformation opportunities that may be identified in source code of a programming language in which cross-statement target typing-related dependencies may be supported, according to at least some embodiments.

In some languages, unlike in the examples listed above, target typing decisions may potentially have impacts which cross statement boundaries. FIG. 3 illustrates an example of interdependent code transformation opportunities that may be identified in source code of a programming language in which cross-statement target typing-related dependencies may be supported, according to at least some embodiments. In the depicted example, source code distributed among two or more files (such as files 310A and 310B) written in a language L2 includes expressions expr4, expr5, expr6 and expr7 for which interacting potential code transformations have been identified by a CAT 120. Expr4 and expr5 are in different statements Q and S respectively within source code file 310A, while expr6 and expr7 are in statement T of source code file 310B. PCT4, PCT5, PCT6 and PCT7 correspond to expr4, expr5, expr6 and expr7. As indicated by TDDs 330A and 330A respectively, both PCT 4 and PCT7 depend on PCT6, while PCT5 depends on PCT7 (TDD 330B). In order to determine the acceptability of the four members of PCT set 340, a CAT 120 may have to evaluate $(2^4-1)$ combinations 350 in the depicted embodiment.

In some languages, the impact of target typing decisions may even cross program boundaries—e.g., the two source code files 310A and 310B, which together form at least part of refactoring candidate section 330 in FIG. 3, may represent different programs. For languages such as L2, in which impacts of target typing decisions may be felt over long "lexical distances" (i.e., in statements which are separated by substantial amounts of intervening code), code analysis tools may sometimes have to retain a larger amount of state information than would typically be needed if the impact of target typing decisions were limited to within statement boundaries.

Figure 4:
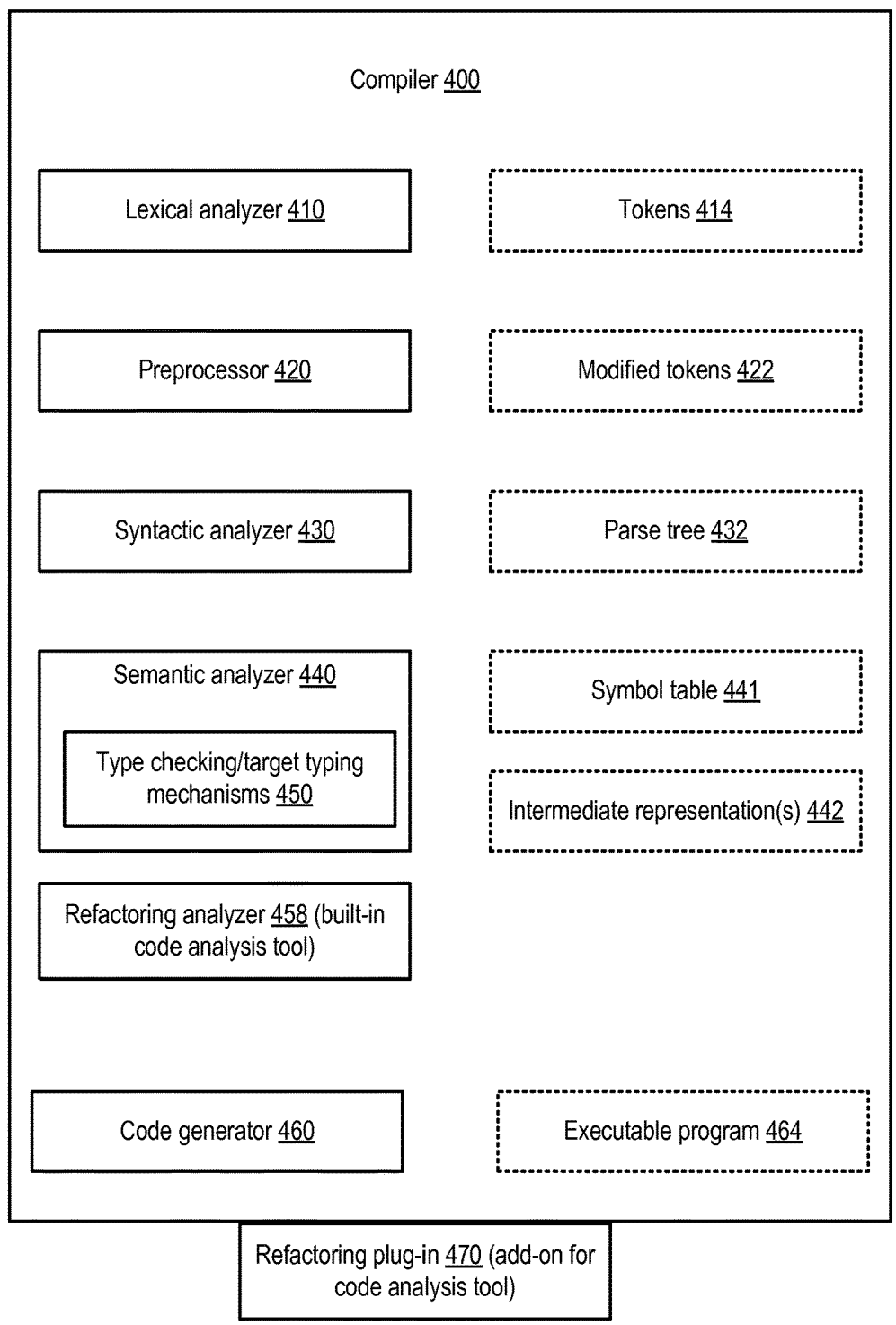
FIG. 4 is a block diagram illustrating the components of a compiler which includes a code analysis tool for performing combinatorial analysis of target typing-related refactoring opportunities, according to at least some embodiments.

Code analysis tools of the kind described above may be packaged in a variety of ways in different embodiments. FIG. 4 is a block diagram illustrating the components of a compiler which includes a code analysis tool for performing combinatorial analysis of target typing-related refactoring opportunities, according to at least some embodiments. The compiler 400 may be implemented in software and executed by a computer system on given set of source code, such as original source code 110 of FIG. 1. In FIG. 4, solid outlines indicate functional components, while dashed lines indicate data structures passed among the functional components.

According to the illustrated embodiment, compiler 400 may include lexical analyzer 410, which may be configured to break the input source code into tokens, such as tokens 412. Each token 412 may correspond to a single atomic unit of the given language, such as keywords, identifiers, etc. In various embodiments, the token syntax may be represented as a regular language. Compiler 400 may include preprocessor 420 in the depicted embodiment, which may be used to support macro substitution in some languages. In some embodiments, preprocessor 420 may modify various ones of tokens 412, which may result in a set of modified tokens, such as 422.

Compiler 400 may also include a syntactic analyzer 430 in some embodiments, which may be configured to parse the modified tokens 422 to identify syntactic structure of the input program. The syntactic analyzer may be configured to build a parse tree, such as parse tree 432, which may organize the tokens 422 into a tree structure according to the formal grammar of the programming language of the source code.

In the depicted embodiment, the compiler 400 may further include a semantic analyzer 440, which may be configured to add semantic information to parse tree 432 to create one or more annotated internal representations of the program, such as intermediate representation 442. Such intermediate representations may also be implemented as trees in some implementations. Type checking and target typing mechanisms 450 may be implemented as part of the semantic analyzer 440 in various embodiments. In some embodiments, semantic analyzer 240 may also build and/or maintain a symbol table, such as symbol table 441, which maps various symbols in the source code to associated information, such as the location, scope, and/or type. The type checking and target typing mechanisms 450 may be utilized by a refactoring analyzer 458, which represents one example of a code analysis tool that identifies PCTs and performs combinatorial analysis for some kinds of PCTs in the manner described above. In one implementation, for example, a built-in code analysis tool implemented as part of a compiler 400, such as refactoring analyzer 458 of FIG. 4, may invoke the other components of the compiler to generate respective internal representations 442 for the different PCT combinations as well as the original source code. The internal representations may then be used to evaluate the acceptability of the PCT combinations. If the source code corresponding to a given PCT combination fails to compile, or if the internal representation of the given PCT combination differs from the internal representation of the original source code in the specific method selected for an overloaded method call, that PCT combination may be rejected as unacceptable in at least some embodiments.

In at least one embodiment, at least some of the functionality of a CAT may be incorporated into a plug-in 470 which may be linked to or otherwise added to a compiler 400. A plug-in 470 may, for example, add user-friendly programmatic interfaces to a command-line compiler 400, enabling compiler users to view, approve and/or select alternative PCTs. In one embodiment, all of the CAT functionality (e.g., including the logic to identify PCTs and ascertain their acceptability, in addition to logic used for implementing user interactions) may be incorporated into a plug-in 470. In some embodiments the compiler 400 may support special flags (such as "-Xrefactor") to enable users to invoke the CAT functions.

In various embodiments, a code generator, such as code generator 460, may convert the intermediate representation(s) 442 into an executable program, such as 464. In at least one embodiment, the CAT (e.g., the built-in refactoring analyzer 458 and/or plug-in 470) may invoke the code generator to obtain one or more versions of executable code 464 corresponding to various refactoring options. Executable program 464 may be encoded in binary and/or byte code in different embodiments. In various embodiments, different components of compiler 400 shown in FIG. 4 may be combined or further deconstructed into multiple components. The compiler may also implement various additional functions, such as optimization, line reconstruction, and the like, not shown explicitly in FIG. 4, in some embodiments.

Figure 5:
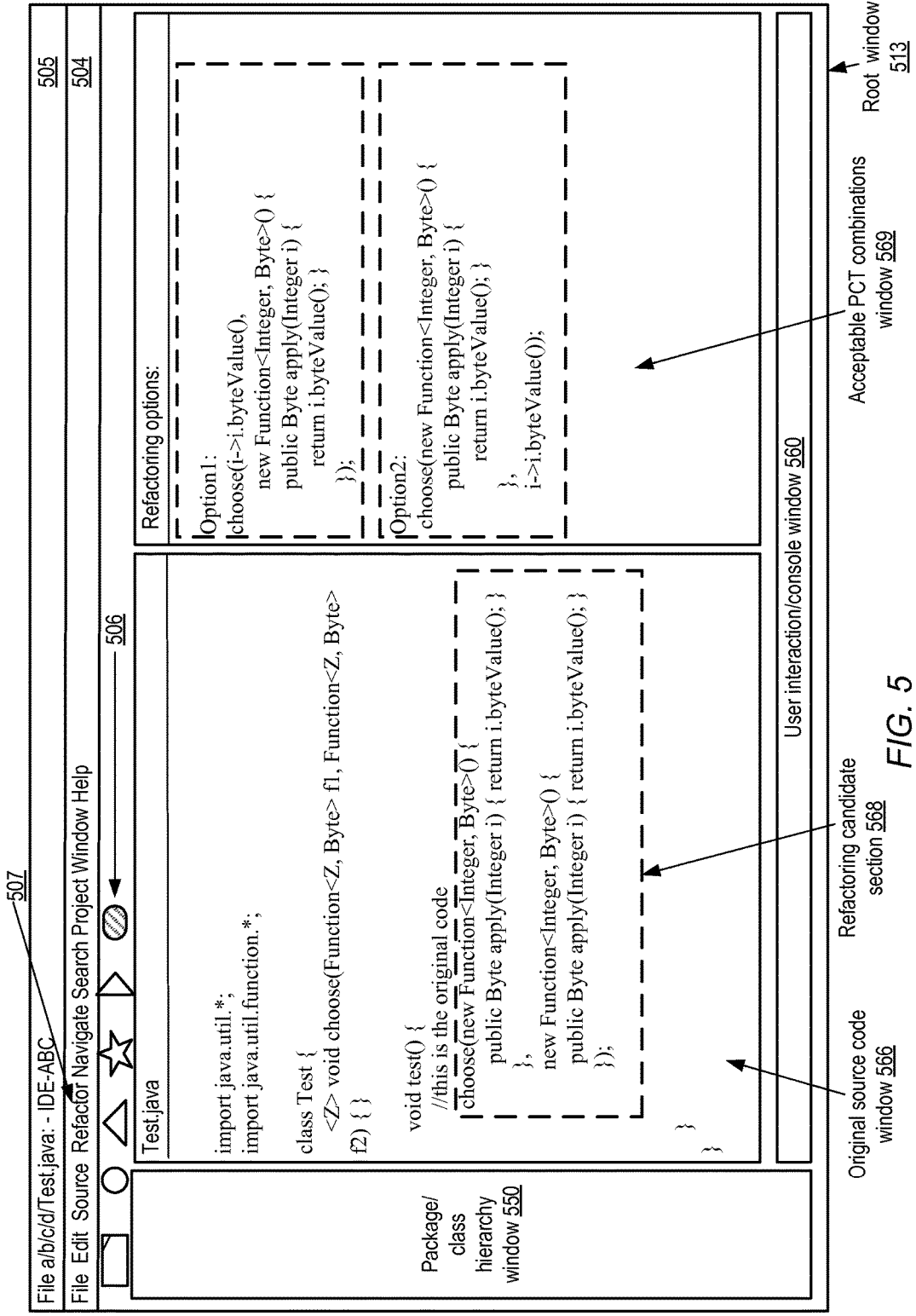
FIG. 5 illustrates an example graphical user interface of an integrated development environment (IDE) which includes a code analysis tool configured to perform combinatorial analysis of target typing-related refactoring opportunities, according to at least some embodiments.

In at least one embodiment, instead of being incorporated within or plugged in to compilers per se, code analysis capabilities of the kind described above may be implemented using components of other tools. FIG. 5 illustrates an example graphical user interface (GUI) of an integrated development environment (IDE) which includes a code analysis tool configured to perform combinatorial analysis of target typing-related refactoring opportunities, according to at least some embodiments. In the illustrated embodiment, the IDE presents a GUI with a number of distinct windows or panels, such as windows 550, 560, 566 and 569. In FIG. 5, these windows are shown as being contained within a single encompassing root window 513; however, in at least some embodiments, some or all of the windows may be detachable from the root window 513 based on the user's preferences, and may be arranged independently of each other on the display being used. Windows may also be rearranged within the root window in some implementations. The IDE UI may include a header line 505, in which the name of the IDE and/or the current source file or source code directory being viewed may be indicated. One or more toolbars showing respective sets of high-level or global commands (such as toolbar 504 with options such as "File", "Edit", and the like, and toolbar 506 with icon representations of command sets) may be displayed in some embodiments. In the depicted embodiment, the "Refactor" option 507 may be used to invoke a code analysis tool capable of identifying target typing-related transformations.

During code development and/or refactoring sessions, the IDE UI may include a package/class hierarchy stack window 550 displaying the relationships of the particular source code file (e.g., Test.java) being displayed in original source code window 566 to other files of the same software project and/or related projects. As a result of an invocation of the code analysis tool of the IDE (e.g., via "Refactor" option 507), a refactoring candidate section 568 may be highlighted within the original source code window 566. The IDE's CAT may identify various combinations of PCTs which could be used in place of refactoring candidate section 568 and determine which combinations are acceptable based on one or more criteria. In at least some embodiments, the techniques used by the IDE to obtain the PCTs (e.g., pattern matching) and then to select the acceptable combinations (e.g., using target typing mechanisms of the programming language) may be similar to those described above with respect to the compiler-based CATs. In some embodiments, the IDE may implement target typing mechanisms similar to those used by compilers and/or actually invoke a compiler. The PCT combinations that satisfy the criteria may then be displayed (e.g., as "Option 1" and "Option 2") in acceptable PCT combinations window 569 in the depicted embodiment. In some embodiments, the user may approve or select a particular PCT combination to be applied to the original source code, e.g., using interaction/console window 560 or simply clicking on the corresponding option in window 569.

It is noted that although the IDE shown in FIG. 5 is for the Java™ programming language, similar IDEs with associated code analysis tools may be used for other programming languages in various embodiments. In at least one embodiment, an IDE may be usable for more than one programming language that supports target typing, and therefore may benefit from the code analysis capabilities described herein. Each of the windows displayed in the IDE UI may include a respective toolbar in some embodiments. One or more of the windows may allow users to bring up context-dependent menus, e.g., by right-clicking using a mouse within the window. For example, in at least one embodiment a user may indicate their preferences for the acceptance criteria to be used for evaluating PCT combinations using such a context-dependent menu. For some source code sections, a user may request that more stringent or multi-level criteria be used than for others, for example.

Figure 6:
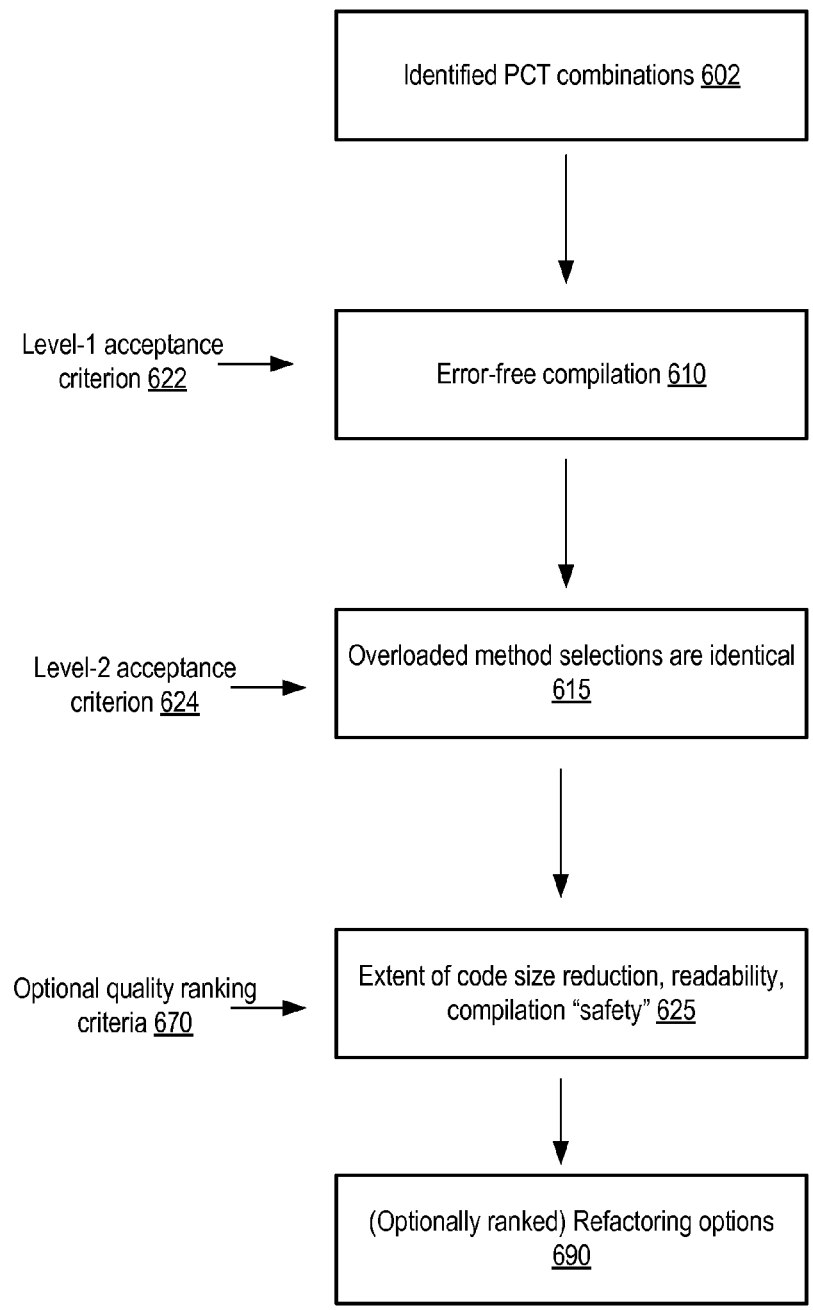
FIG. 6 illustrates examples of acceptance and ranking criteria that may be applied to potential code transformation combinations, according to at least some embodiments.

As mentioned earlier, in various embodiments a code analysis tool may perform several steps to evaluate the PCT combinations identified for a refactoring candidate section. FIG. 6 illustrates examples of acceptance and ranking criteria that may be applied to potential code transformation combinations, according to at least some embodiments. It is noted that in the depicted embodiment, the original source code (i.e., the source code as it exists prior to any transformations identified by the CAT) is assumed to compile without errors.

Up to two levels of acceptance criteria may be checked in the depicted embodiment, followed by an optional quality ranking step. With respect to the first level, (Level-1 acceptance criterion 622), the CAT may verify whether, subsequent to the application or implementation of a given PCT combination of the identified PCT combinations 602, the source code would compile without generating any compilation errors, as indicated in box 610. In at least one embodiment in which a compiler is capable of providing warning messages in addition to indicating errors, the Level-1 acceptance criteria may also require that no warnings (or at least no warnings of a particular severity level) be produced as a result of applying the PCT combination being analyzed. In some embodiments, the only acceptance criteria used may involve verification of error-free (and/or warning-free) compilation.

If a given PCT combination passes the first acceptance test, Level-2 acceptance criterion 624 may be checked in the embodiment shown in FIG. 6. In order to satisfy the Level-2 acceptance criterion 624, the particular methods selected by a compiler for one or more overloaded method calls (if any such calls are present) in the refactoring candidate section may have to match the methods that were selected for the original source code, as indicated in box 615 of FIG. 6. In at least some embodiments, the CAT may examine the byte code or executable versions of the original source code, and of the transformed code, to check whether the methods selected for overloaded method calls match. In one implementation, intermediate annotated tree representations of the pre-transformation source code and the post-transformation source code (similar to representations 442 of FIG. 4) may be compared in the second level of acceptance testing. To verify the acceptability of each PCT combination being considered, the CAT may thus perform one or more sets of speculative compilations in at least some embodiments, and reject those PCT combinations whose speculative compilations do not meet the criteria being used.

In the embodiment depicted in FIG. 6, if multiple PCT combinations meet both levels of acceptance criteria, the CAT may optionally attempt to rank the acceptable combinations based on one or more quality criteria 670. For example, under the assumption that all other factors being equal, the quality of source code varies inversely with the size of the source code, the different PCT combinations may be ranked based on the extent of code size reductions achieved. In some embodiments, the CAT may use one or more rules to obtain readability scores or ranks of the different PCT combinations that passed the acceptance criteria. Readability-based criteria may at least in some cases result in different rankings than code size reduction-based criteria. In at least one embodiment, the CAT may also rank the PCT combinations based on the safety or certainty of compilation decisions that would result from application of the combinations. For example, it may be possible to assign relative certainty scores to various target typing-related decisions, and two different PCT combinations (which meet the acceptance criteria) may differ in their relative certainty scores. Quality criteria other than those indicated in box 625 may be used in different embodiments.

After it has performed the acceptance testing, the CAT may provide a user with the list of refactoring options 690 which correspond to the PCT combinations that meet the acceptance criteria being used. In some embodiments, the options that are acceptable may be provided in order of quality rankings, or quantitative/qualitative indications of the relative rankings may be provided together with the refactoring options.

In some embodiments, when evaluating different combinations of a group of PCTs identified for a refactoring candidate section, a CAT may evaluate each PCT independently of the others. In other embodiments, it may be more useful to consider sub-combinations (e.g., pairs or triples) of the PCTs, e.g., because of relationships identified between the PCTs or under the assumption that the quality of refactoring increases with the number of PCTs applied. The acceptability decisions made by the CAT may depend on whether the PCTs are analyzed individually or in sub-groups. FIG. 7 illustrates an example set of decisions that may be made by a code analysis tool regarding the inclusion, within a set of refactoring options to be provided to a user, of individual code transformations of a set of four potential identified code transformations (PCT1, PCT2, PCT3 and PCT4), according to at least some embodiments. Using one or more acceptance criteria similar to those described above, the logical equivalent of an acceptance table 710 may be created, with rows corresponding to each combination of PCTs being considered, and a result column indicating whether the combinations met the acceptance criteria. In the notation used in FIG. 7, the different combinations are labeled C1-C15, and an entry for the original source code (which has none of the PCTs) labeled C0. For any given row corresponding to one of the combinations C1-C15, a "1" in the column for any given PCT indicates that the given PCT is applied in the combination, and a "0" indicates that that PCT is not applied. Thus, for example, in combination C3, PCT3 and PCT4 are applied, and PCT1 and PCT2 are not applied. In the example shown, ten of the combinations (C2, C3, C5, C6, C7, C9, C10, C11, C14 and C15) meet the acceptance criteria, as indicated by the "Yes" entries in the final column of table 710. The remaining five combinations (C1, C4, C8, C12 and C13) fail the acceptance criteria being used.

When determining, for each PCT independently of the others, whether that PCT should be included in the set of refactoring options provided to a user, the CAT may examine the acceptability of all the combinations in which that PCT is included (i.e., has a "1" in the combination's row). In the depicted embodiment, as indicated in decision table 712, a given PCT is included in the refactoring options only if all the combinations which include that PCT pass the acceptance tests. For example, for PCT1 to be included in the refactoring options, the combinations C8, C9, C10, C11, C12, C13, C14 and C15 (in each of which the PCT1 column in table 710 has a "1") would all have to pass the acceptance test(s). However, because C8, C12 and C13 did not meet the acceptance criteria, PCT1 is not included in the refactoring options, as indicated in the rightmost column of table 712. Similarly, PCT2 is not included in the refactoring options because C4, C12 and C13 failed acceptance testing, and PCT4 is not included because C1 and C13 failed acceptance testing. In contrast, since all the combinations (C2, C3, C6, C7, C10, C11, C14 and C15) in which PCT3 is included passed the acceptance tests, PCT3 is provided as a refactoring option to the user.

FIG. 8 illustrates an example set of decisions that may be made by a code analysis tool regarding the inclusion, within a set of refactoring options to be provided to a user, of pairs of code transformations of a set of four potential identified code transformations, according to at least some embodiments. Acceptance table 710 (with the same entries as in FIG. 7) is once again obtained by the CAT, but instead of considering the acceptability of individual PCTs independently of each other, the CAT now examines the acceptance results of various pairs of the PCTs. As shown in table 812, six pairs are evaluated: (PCT1, PCT2), (PCT1, PCT3), (PCT1, PCT4), (PCT2, PCT3), (PCT2, PCT4) and (PCT3, PCT4). If, for all rows of table 710 in which both columns corresponding to a given PCT pair has "1"s, the acceptance criteria are met, the given pair is included in a set of refactoring options provided to the user. For example, the combinations in which PCT1 and PCT2 are both included (as indicated by the "1"s in the corresponding columns) are C12, C13 and C14. Since C12 and C14 fail the acceptance criteria, the PCT pair (PCT1, PCT2) may not be included in the set of refactoring options provided to the user in the depicted embodiment. In contrast, the combinations in which PCT3 and PCT4 are both included are C3, C7, C11 and C15, all of which are acceptable; accordingly, the pair (PCT3, PCT4) is included in the refactoring options as indicated in the rightmost column of table 812. For similar reasons, the combinations (PCT1, PCT3) and (PCT2, PCT3) may also be included in the refactoring options. The combinations (PCT1, PCT4) and (PCT2, PCT4) may be excluded, as at least one of the combinations which include these pairs fails the acceptance tests.

In some embodiments, sub-combinations of different numbers of PCTs may be considered as possible refactoring options—for example, instead of or in addition to considering pairs of PCTs as shown in FIG. 8, PCT triplets or four PCTs may be analyzed at a time. In at least some embodiments, a user may be able to provide input to the CAT indicating whether combinations of PCTs are to be considered (and if so, what the sizes of those combinations should be), or whether the PCTs are to be evaluated independently of one another as in FIG. 7.

Figure 9:
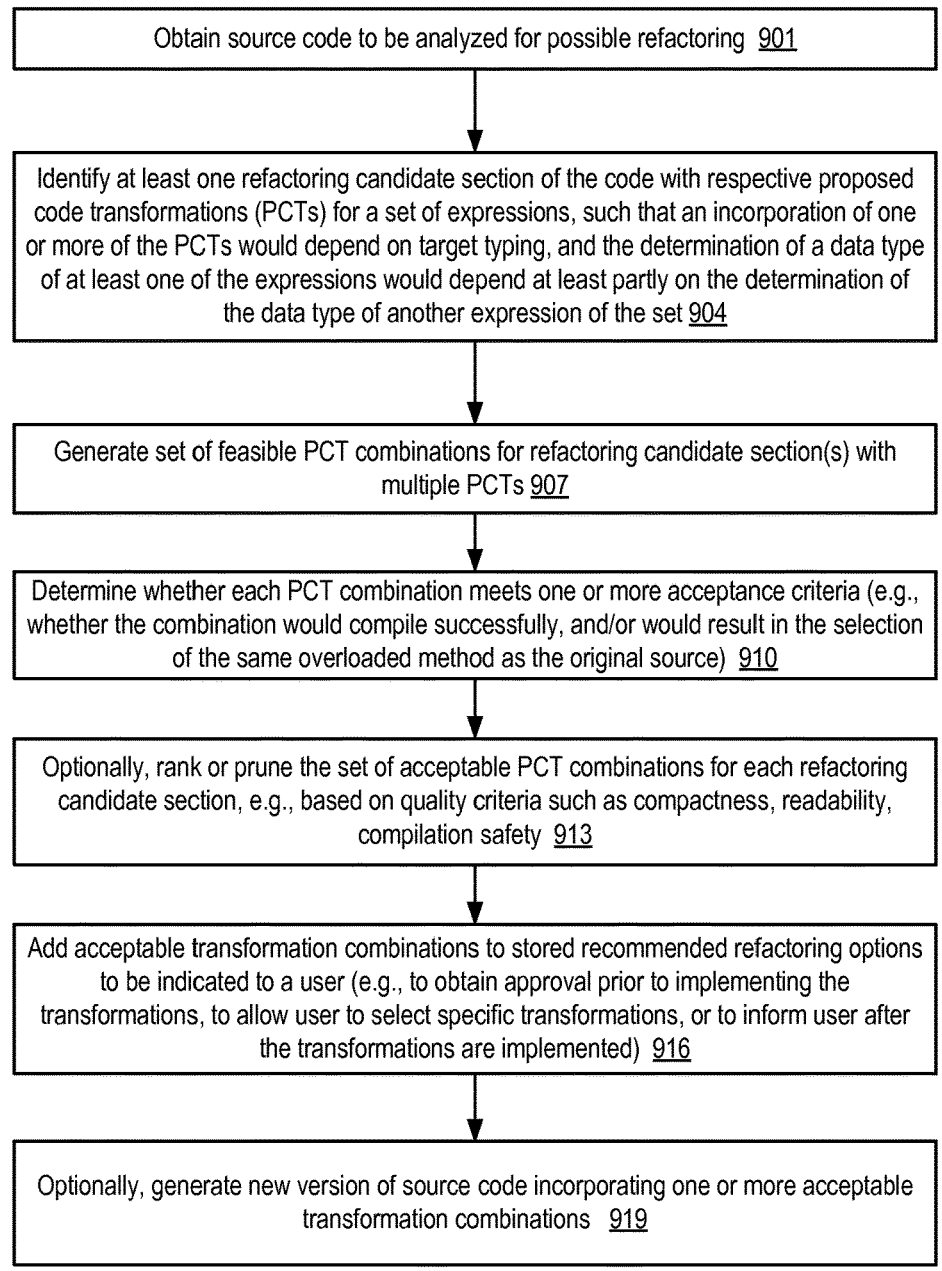
FIG. 9 is a flow diagram illustrates aspects of the operations of a code analysis tool configured to perform combinatorial analysis on potential code transformations involving target typing, according to some embodiments.

FIG. 9 is a flow diagram illustrates aspects of the operations of a code analysis tool (CAT) configured to perform combinatorial analysis on potential code transformations involving target typing, according to some embodiments. As shown in element 901, the CAT may receive or obtain an indication of the original source code which is to be examined for possible refactoring opportunities. A number of different programmatic interfaces may be implemented to enable users to indicate the source code in different embodiments—e.g., an IDE-like environment may be used, or a command-line interface similar to that provided by many standalone compilers may be used.

As indicated in element 904, the CAT may identify one or more refactoring candidate sections of the code. Various patterns or templates indicative of specific refactoring opportunities available in one or more versions of the programming language of the source code is written may be used in different implementations to identify the candidate sections. At least one section may include a plurality of expressions with respective potential code transformations (PCTs) identified, such that (a) the application of at least one of the PCTs to the source code would depend upon an exercise of a target typing mechanism of the programming language and (b) a type determination dependency exists between at least one of the expressions and another of the expressions. That is, the result of a determination of the data type of one of the expressions for which a PCT could be applied may depend at least in part on the determination of the data type of another expression for which a different PCT could be applied. The boundaries of the refactoring candidate sections identified may correspond to single statements of the language in some embodiments (as in the example shown in FIG. 2), while in other embodiments different interdependent expressions may potentially be located in widely-separated statements (as indicated in FIG. 3).

For each refactoring section with multiple PCTs, the CAT may generate a set of feasible PCT combinations (element 907). If N different PCTs are found, for example, in at least one implementation ($2^N-1$) combinations may be generated. One or more criteria may be used to evaluate whether each of the PCT combinations are acceptable (element 910). In one embodiment, if the source code resulting from applying a given PCT combination compiles without errors, that combination may be deemed acceptable. In other embodiments, in addition to successful compilation, a PCT combination would have to result in the selection of the same overloaded method in order to be considered acceptable. Other acceptance criteria may be used in various embodiments. In some embodiments, individual PCTs may be evaluated for acceptance independently of each other (as indicated in FIG. 7), while in other embodiments, the independence requirement may not apply and sub-combinations comprising multiple PCTs may be evaluated for acceptance in the manner illustrated in FIG. 8.

In some embodiments, if more than one PCT combination meets all the acceptance criteria, the multiple acceptable combinations may optionally be ranked relative to one another (element 913). Heuristics or rules associated with any of various quality indicators may be used for the ranking, such as the extent to which the code size is reduced as a result of the transformations, the readability of the resulting code, or the safeness/certainty of one or more compiler decisions that would have to be made after the transformations are applied. Acceptable PCT combinations may be stored, e.g., in a list or collection of recommended or approved refactoring options to be indicated to a user (element 916). The manner in which the recommended or acceptable PCT combinations are stored, the kinds of memory or storage locations at which they are stored, and/or the duration for which they are stored may differ in various embodiments—e.g., in some cases the acceptable PCT combinations may be stored in a volatile buffer in main memory before being transmitted or displayed, while in other embodiments the acceptable PCT combinations may be stored in persistent storage from which they may later be retrieved for presentation to a user or client of the CAT. In some embodiments, the CAT may require assent or approval of the user before generating any new versions of the source code, for example. In at least one embodiment, a user may select one combination to be applied out of a plurality of options presented by the CAT. In another embodiment, the CAT may apply some set of acceptable PCTs and generate a new version of the code (element 919) without necessarily requiring interactions from the user. In such a scenario, the list of acceptable transformations that were applied may be provided to the user after the new version is generated.

Figure 10:
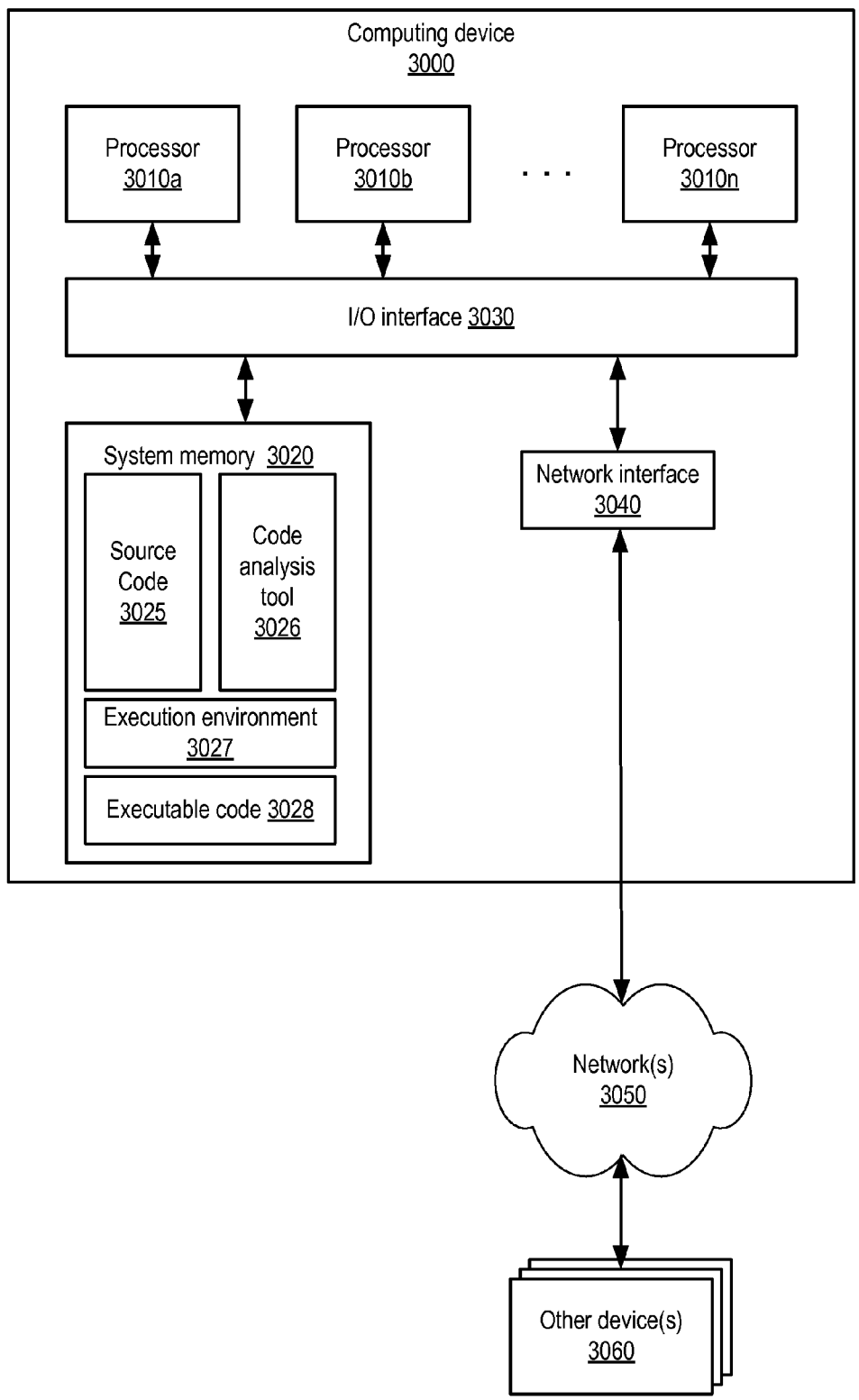
FIG. 10 is a block diagram illustrating a computing device configured to implement a code analysis tool, according to at least some embodiments.

FIG. 10 is a block diagram illustrating a computing device 3000 configured to implement a code analysis tool with support for identifying refactoring options of the kind described above, according to at least some embodiments. The computer device 3000 may correspond to any of various kinds of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any kind of computing device. In the illustrated embodiment, computing device 3000 includes one or more cores or processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several cores or processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the SPARC, x86, PowerPC, or MIPS ISAs, or any other suitable ISA. In multiprocessor systems, each of processors 3010 may commonly, but not necessarily, implement the same ISA.

System memory 3020 may be configured to store program instructions implementing a code analysis tool 3026, source code 3025 of various programs to be analyzed, executable code 3028 generated by the code analysis tool or by a compiler, and an execution environment 3027 (e.g., a Java™ virtual machine). System memory may also include program instructions and/or data for various other applications. Program instructions may be encoded in platform native binary, any interpreted language such as Java™ bytecode, or in any other language such as C/C++, Java™, etc or in any combination thereof. In various embodiments, system memory 3020 may be implemented using any suitable memory technology, such as static random access memory (SRAM), synchronous dynamic RAM (SDRAM), nonvolatile/Flash-type memory, or any other kind of memory.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, which may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory computer-readable storage medium storing program instructions executable by a computer to implement a code analysis tool (CAT) for a programming language, wherein the CAT is configured to:

identify one or more refactoring candidate sections of source code representing at least a portion of one or more computer programs, the one or more refactoring candidate sections including a first refactoring candidate section which comprises (a) a first expression for which a first proposed code transformation (PCT) is available and (b) a second expression for which a second PCT is available, wherein an application of the first PCT to the source code would result in an exercise of a target typing mechanism of the programming language, wherein the exercise of the target typing mechanism comprises inferring one or more types omitted from the first or second expression based on a context of the other expression of the first and second expressions;

generate a plurality of PCT combinations corresponding to the first refactoring candidate section, wherein one or more of the PCT combinations include the first PCT, or the second PCT, or both the first PCT and the second PCT, wherein at least a particular PCT combination of the plurality of PCT combinations includes a target typing dependency between the first expression and the second expression such that subsequent to an application of the particular PCT combination, a determination of a data type of at least one expression of the first and second expressions is dependent at least in part on a determination of a data type of the other expression of the first and second expressions; and in response to a determination that at least the particular PCT combination meets one or more acceptance criteria, storing an indication that a refactoring option which includes the particular PCT combination is recommended, wherein to satisfy at least one of the acceptance criteria the particular PCT combination including the target typing dependency is determined to compile without error.

2. The non-transitory computer-readable storage medium as recited in claim 1, wherein the first PCT includes one or more of: (a) a removal of a type argument from the first expression, (b) a replacement of a portion of source code by a lambda expression, (c) a removal of an explicit formal argument type from a lambda expression, instance creation expression or generic method call, or (d) a removal of a cast.

3. The non-transitory computer-readable storage medium as recited in claim 1, wherein an acceptance criterion of the one or more acceptance criteria comprises a requirement that, subsequent to an implementation of a PCT combination being evaluated for acceptance, a compilation of the source code does not result in a compilation error.

4. The non-transitory computer-readable storage medium as recited in claim 1, wherein a compilation of the source code prior to generation of the plurality of PCT candidates results in a selection of a particular method from among a plurality of overloaded methods corresponding to a method call in the first refactoring candidate section, wherein an acceptance criterion of the one or more acceptance criteria comprises a requirement that, subsequent to an implementation of a PCT combination being evaluated for acceptance, a compilation of the source code results in a selection of the particular method from among the plurality of overloaded methods corresponding to the method call in the first refactoring candidate section.

5. The non-transitory computer-readable storage medium as recited in claim 1, wherein the CAT is incorporated within a compiler.

6. The non-transitory computer-readable storage medium as recited in claim 1, wherein the CAT is incorporated within an integrated development environment for the programming language.

7. The non-transitory computer-readable storage medium as recited in claim 1, wherein the CAT is configured to:
receive, via a programmatic interface, an indication that one or more PCT combinations from a plurality of mutually incompatible PCT combinations have been selected for application to the source code, wherein the plurality of mutually incompatible PCT combinations includes the particular PCT combination.

8. The non-transitory computer-readable storage medium as recited in claim 1, wherein the CAT is configured to:
in response to a determination that a second PCT combination of the plurality of PCT combinations does not meet the one or more acceptance criteria, exclude the second PCT combination from a set of recommended refactoring options.

9. A method, comprising:
performing, by a code analysis tool implemented on one or more computing devices:
identifying one or more refactoring candidate sections of source code representing at least a portion of one or more computer programs, the one or more refactoring candidate sections including a first refactoring candidate section which comprises (a) a first expression for which there is a first proposed code transformation (PCT) available and (b) a second expression for which there is a second PCT available, wherein an application of the first PCT to the source code would result in an exercise of a target typing mechanism of a programming language used for the source code, wherein the exercise of the target typing mechanism comprises inferring one or more types omitted from the first or second expression based on a context of the other expression of the first and second expressions;
generating a plurality of PCT combinations corresponding to the first refactoring candidate section, wherein one or more of the PCT combinations include the first PCT, or the second PCT, or both the first PCT and the second PCT, wherein at least a particular PCT combination of the plurality of PCT combinations includes a target typing dependency between the first expression and the second expression such that subsequent to an application of the particular PCT combination, a determination of a data type of at least one expression of the first and second expressions is dependent at least in part on a determination of a data type of the other expression of the first and second expressions; and
in response to determining that at least the particular PCT combination meets one or more acceptance criteria, storing an indication that a refactoring option which includes the particular PCT combination is recommended, wherein to satisfy at least one of the acceptance criteria the particular PCT combination including the target typing dependency is determined to compile without error.

10. The method as recited in claim 9, wherein the first PCT includes one or more of: (a) a removal of a type argument from the first expression, (b) a replacement of a portion of source code by a lambda expression, (c) a removal of an explicit formal argument type from a lambda expression, instance creation expression or generic method call, or (d) a removal of a cast.

11. The method as recited in claim 9, wherein an acceptance criterion of the one or more acceptance criteria comprises a requirement that, subsequent to an implementation of a PCT combination being evaluated for acceptance, a compilation of the source code does not result in a compilation error.

12. The method as recited in claim 9, wherein a compilation of the source code prior to generation of the plurality of PCT candidates results in a selection of a particular method from among a plurality of overloaded methods corresponding to a method call in the first refactoring candidate section, wherein an acceptance criterion of the one or more acceptance criteria comprises a requirement that, subsequent to an implementation of a PCT combination being evaluated for acceptance, a compilation of the source code results in a selection of the particular method from among the plurality of overloaded methods corresponding to the method call in the first refactoring candidate section.

13. The method as recited in claim 9, further comprising performing, by the code analysis tool:
in response to determining that a second PCT combination of the plurality of PCT combinations meets the one or more acceptance criteria,
assigning respective quality rankings to the particular PCT combination and the second PCT combination; and
providing an indication of the quality rankings of the particular PCT combination and the second PCT combination.

14. The method as recited in claim 9, wherein the programming language is one of: an object-oriented programming language, or a functional programming language.

15. A system, comprising:
one or more processors;
a memory coupled to the one or more processors, wherein the memory stores program instructions executable by the processors to implement a code analysis tool (CAT) for a programming language, wherein the CAT is configured to:
identify one or more refactoring candidate sections of source code representing at least a portion of one or more computer programs, the one or more refactoring candidate sections including a first refactoring candidate section which comprises (a) a first expression for which a first proposed code transformation (PCT) is available and (b) a second expression for which a second PCT is available, wherein an application of the first PCT to the source code would result in an exercise of a target typing mechanism of the programming language, wherein the exercise of the target typing mechanism comprises inferring one or more types omitted from the first or second expression based on a context of the other expression of the first and second expressions;
generate a plurality of PCT combinations corresponding to the first refactoring candidate section, wherein one or more of the PCT combinations include the first PCT, or the second PCT, or both the first PCT and the second PCT, wherein at a particular PCT combination of the plurality of PCT combinations includes a target typing dependency between the first expression and the second expression such that subsequent to an application of the particular PCT combination, a determination of a data type of at least one expression of the first and second expressions is dependent at least in part on a determination of a data type of the other expression of the first and second expressions; and
in response to a determination that at least a particular PCT combination of the plurality of PCT combinations meets one or more acceptance criteria, store an indication that a refactoring option which includes the particular PCT combination is recommended wherein to satisfy at least one of the acceptance criteria the particular PCT combination including the target typing dependency is determined to compile without error.

16. The system as recited in claim 15, wherein the first PCT includes one or more of: (a) a removal of a type argument from the first expression, (b) a replacement of a portion of source code by a lambda expression, (c) a removal of an explicit formal argument type from a lambda expression, instance creation expression or generic method call, or (d) a removal of a cast.

17. The system as recited in claim 15, wherein an acceptance criterion of the one or more acceptance criteria comprises a requirement that, subsequent to an implementation of a PCT combination being evaluated for acceptance, a compilation of the source code does not result in a compilation error.

18. The system as recited in claim 15, wherein a compilation of the source code prior to generation of the plurality of PCT candidates results in a selection of a particular method from among a plurality of overloaded methods corresponding to a method call in the first refactoring candidate section, wherein an acceptance criterion of the one or more acceptance criteria comprises a requirement that, subsequent to an implementation of a PCT combination being evaluated for acceptance, a compilation of the source code results in a selection of the particular method from among the plurality of overloaded methods corresponding to the method call in the first refactoring candidate section.

19. The system as recited in claim 15, wherein the first expression occurs within a particular statement of the source code, and the second expression occurs within another statement of the source code.

20. The system as recited in claim 15, wherein, the first PCT includes a use of target typing.

* * * * *

UNITED STATES PATENT AND TRADEMARK OFFICE
CERTIFICATE OF CORRECTION

PATENT NO. : 10,303,467 B2
APPLICATION NO. : 14/685386
DATED : May 28, 2019
INVENTOR(S) : Cimadamore et al.

Page 1 of 1

It is certified that error appears in the above-identified patent and that said Letters Patent is hereby corrected as shown below:

In the Specification

In Column 16, Line 14, delete "that that" and insert -- that --, therefor.

Signed and Sealed this
Twenty-eighth Day of July, 2020

Andrei Iancu
*Director of the United States Patent and Trademark Office*